Aug. 29, 1944.   C. G. HARRIS   2,357,258
BAKERY FLAVORING PRODUCT AND METHOD OF MAKING SAME
Filed Jan. 22, 1941
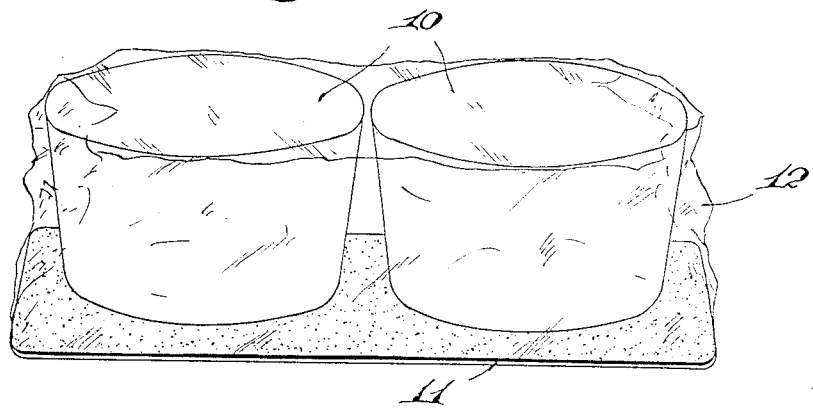
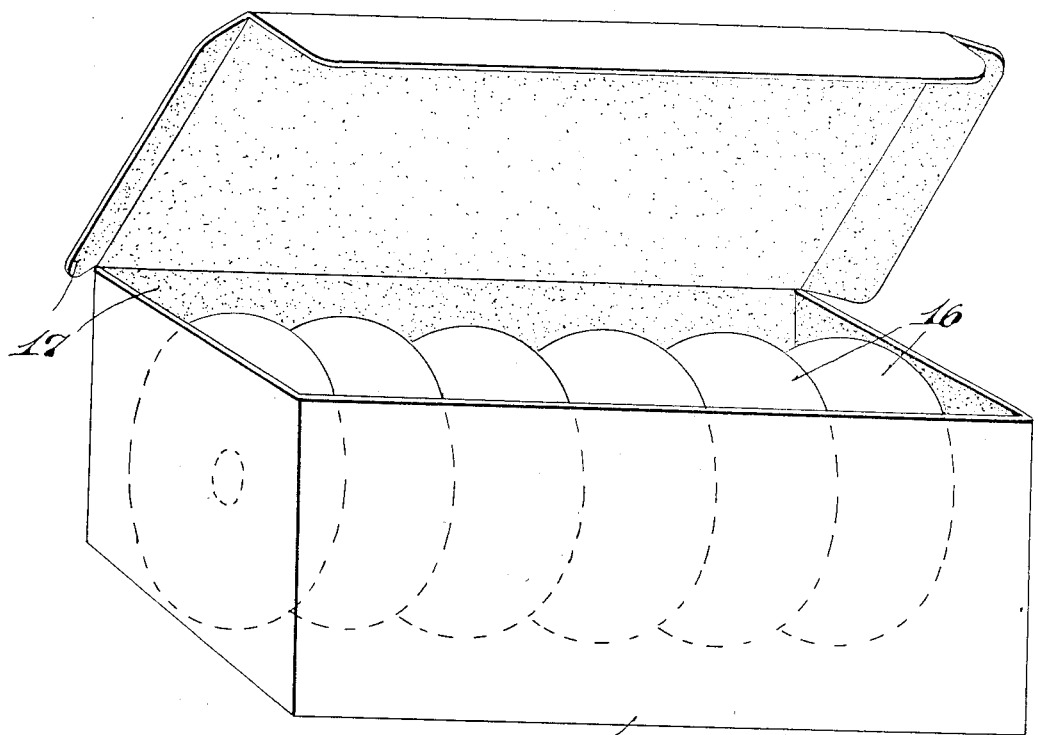
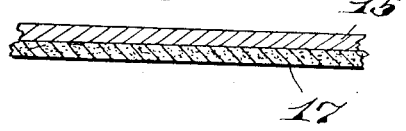
Inventor
Clifford G. Harris,
By
Attorney Patented Aug. 29, 1944

2,357,258

UNITED STATES PATENT OFFICE 2,357,258

BAKERY FLAVORING PRODUCT AND METHOD OF MAKING SAME

Clifford G. Harris, Binghamton, N. Y.

Application January 22, 1941, Serial No. 375,529

7 Claims. (Cl. 99—172)

This invention relates to a process of imparting flavor to and retaining flavor in bakery products such as cup cakes, layer cakes, cookies and the like. The invention comprehends also a novel bakery product package in which any desired flavor may be imparted to finished and packaged commercial bakery products as aforesaid.

The principal object of the invention is to provide commercial bakery products with the full flavor and goodness found in home baking. In home baking, in addition to flavoring extracts, considerable quantities of high grade butter and cream are used as shortening agents and these of themselves impart a certain degree of tastiness to the finished product which is not present in commercial baking, where it is necessary to substitute synthetic and cheaper products for the shortening ingredients.

In commercial baking the comparative tastelessness is compensated for by adding to the commercial product rather large quantities of flavoring extracts, but this is difficult for the reason that the flavoring extracts are volatile and are lost from the product during the baking operation. Furthermore, an initial 100 pounds of cake dough loses 25 to 40 pounds in weight in baking, dependent on the recipe used. With volatile flavoring mixed in the liquid content of the wet dough and with 50% to 75% of the total moisture in the dough evaporating off in the oven during baking, it is obvious that the cake possesses little flavor. This is especially true when it is realized that the flavoring materials volatilize at a much faster rate than the water content.

This invention contemplates the procedure of exposing the finished commercial bakery product to volatile flavoring in such a manner that the shortening ingredients in the product will absorb and retain the flavoring. The butter, cream or synthetic shortening agents used in the commercial product are absorbent insofar as the flavoring agents are concerned and will retain these agents in the wrapped bakery product for an indefinite period of time. By "shortening" it is meant to include not only the additional oils and fats added to the cake dough but also the natural oils in the flour, the butter fat in the milk and cream, and the fat in the egg yolk.

Moreover, the invention contemplates and aims to provide a novel commercial bakery product package by which the procedure of flavoring baked products as aforesaid may be carried on within the package in which the baked and finished porducts are wrapped or packaged for sale. More specifically, a package according to the invention incorporates a suitable carrier or base for a volatile flavoring material which is free to volatilize and thereby give off within the package enclosure or space and about the baked product an atmosphere of the selected flavor which is absorbed and retained by the product "shortening."

Other objects will be in part obvious and in part pointed out hereinafter in connection with the following analysis of this invention wherein are illustrated typical embodiments of the invention in detail.

In the drawing—

Fig. 1 is a perspective view of a commercial cup cake package according to the invention for imparting a desired flavor to the packaged cup cakes;

Fig. 2 is a perspective view of a cruller package in which, according to the invention, flavor may be imparted to the packaged product, the box or container being open to show interior construction;

Fig. 3 is a section taken along line 3—3 of Fig. 2.

According to the invention flavoring may be applied to finished bakery products in any one of several ways, as for instance, by providing a porous or absorbent base preferably of sheet material, such as cardboard, and spraying or otherwise applying a volatile flavoring material on the absorbent base so that the latter serves as a carrier for the flavoring material. Thereupon, the base sheet in which the flavoring is absorbed may be wrapped or packaged together with the baked product to be flavored in foil paper, tin boxes or other impervious wrappings, so that the volatile material is confined around the baked product.

As illustrative of the above procedure and a bakery product package according to the invention, reference is had to the cup cake package shown in Fig. 1 wherein two cup cakes 10 are shown as disposed on a sheet 11 of cardboard impregnated with a volatile flavoring material of flavor selected to be imparted to the cakes, the impregnated sheet serving as the package base sheet. As shown, the cakes and the cardboard base sheet are enclosed within a transparent wrapper 12 of suitable air-excluding material, it being understood that other types of air-excluding wrappers or containers may be employed.

Another manner of applying the flavoring is to incorporate the flavoring material into a suitable absorbent layer applied to or affixed to the wall or walls of the carboard box. While the absorbent layer may be of dough or pastry a practical procedure is to form the layer from a base sheet of porous material impregnated with the volatile flavoring material, and to apply or affix the same to the walls of the cardboard box containing the baked product in such manner that the sheet provides a package inner liner. Referring to Fig. 2, which is illustrative of such a lined package according to the invention, there is shown a cardboard box 15 containing a plurality of crullers 16, for example. A porous material base sheet 17 as aforesaid is applied or affixed to the relatively inner walls of the box, so as to form an inner lamination thereon (Fig. 3). The porous inner ply or liner is impregnated with the volatile flavoring material and, if desired, the outer cardboard ply may be treated on its outer surface with paraffin or like substance to grease and moisture-proof the same, as is well known. A cardboard box as aforesaid may be closed airtight by proper manipulation of its cover, thereby to exclude the air and to confine the volatile flavoring material about the crullers contained in the closed box.

Instead of applying the volatile flavoring material to a porous base sheet functioning as a package inner liner as described, the flavoring material may be applied directly to the inside surface of a cardboard box in which cakes are conventionally sold, as by spraying.

As many changes could be made in packages as aforesaid, depending on the particular product to be packaged and flavored, without departing from the scope of the invention, it is intended that all matter contained in the above description or shown in the accompanying drawing shall be interpreted as illustrative and not in a limiting sense.

It has been found that the discs, sheets or boxes formed of absorbent material may be prepared well in advance by having the flavoring impregnated therein and thereafter suitably sealed until such times as they are to be used.

While the preparation of the flavoring agents per se is not a necessary part of the present invention, it has been found, however, that most of the volatile flavoring oils, esters, ethers and the like should be reduced with a suitable solvent. The majority of these flavors can be mixed and dissolved in vegetable, mineral or animal oils, although mineral oil is preferred. These vehicles or carriers retard evaporation of the volatile flavors and permit the impregnated absorbent material to hold the flavors over a considerable period of time. The oily carrier also prevents the finished cake from sticking to the baking tin, container or wrapper.

What I claim is:
1. The method of flavoring finished bakery products which includes the steps of applying volatile flavoring material to an absorbent sheet from which it is free to volatilize, placing the finished bakery product in close proximity thereto and thereafter packaging the bakery product and absorbent sheet together as a unit.

2. An article of manufacture comprising an absorbent sheet impregnated with a volatile flavoring material free to volatilize and leave said sheet, enclosed in a package with a finished bakery product, whereby said flavoring material may be absorbed by said bakery product.

3. A bakery product package comprising a baked product, a sealed wrapping therefor, and a product flavoring sheet contained within the package, said sheet being of absorbent material and being impregnated with a volatile flavoring material which is free to volatilize and thereby to provide within the sealed package space and about said product an atmosphere of the flavoring material.

4. A bakery product package comprising a baked product, a sealed wrapping therefor, and a product flavoring and base sheet contained within the package and comprising a sheet of cardboard impregnated with a volatile flavoring material which is free to volatilize and thereby to provide within the sealed package space and about the product an atmosphere of the flavoring material.

5. The method of flavoring bakery products, which consists in disposing the baked product to be flavored on a base sheet carrying a volatile flavoring material which is free to volatilize, and enclosing the product and the base sheet in a wrapper in such manner that the baked product is exposed to an atmosphere of volatilized flavoring material maintained within the wrapper.

6. The method of flavoring bakery products which consists in enclosing the baked product to be flavored and an absorbent sheet impregnated with a volatile flavoring material which is free to volatilize in a package in such manner that the sheet forms an inner package liner and that the baked product is exposed within the package to an atmosphere of the volatilized flavoring material emitted by the sheet.

7. A bakery product package comprising a baked product enclosed within a package, and an absorbent sheet providing an inner lining for the package, said sheet being impregnated with a volatile flavoring material free to volatilize, and thereby to provide within the package space and about said product an atmosphere of the flavoring material.

CLIFFORD G. HARRIS.